(12) United States Patent
Liang et al.

(10) Patent No.: US 10,817,350 B2
(45) Date of Patent: Oct. 27, 2020

(54) METHOD AND DEVICE FOR STARTING EXTERNAL APPLICATION PROGRAM IN BROWSER

(71) Applicant: GUANGZHOU UCWEB COMPUTER TECHNOLOGY CO., LTD., Guangzhou (CN)

(72) Inventors: Jie Liang, Guangzhou (CN); Yaozong Kuang, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 380 days.

(21) Appl. No.: 14/653,179

(22) PCT Filed: Nov. 1, 2013

(86) PCT No.: PCT/CN2013/086450
§ 371 (c)(1),
(2) Date: Jun. 17, 2015

(87) PCT Pub. No.: WO2014/094508
PCT Pub. Date: Jun. 26, 2014

(65) Prior Publication Data
US 2015/0339175 A1 Nov. 26, 2015

(30) Foreign Application Priority Data
Dec. 17, 2012 (CN) .......................... 2012 1 0553047

(51) Int. Cl.
*G06F 9/455* (2018.01)
*G06F 9/54* (2006.01)
(Continued)

(52) U.S. Cl.
CPC .......... *G06F 9/542* (2013.01); *G06F 9/45529* (2013.01); *G06F 9/4843* (2013.01); *G06Q 20/20* (2013.01)

(58) Field of Classification Search
CPC ...... G06F 9/542; G06F 9/45529; G06Q 20/20
(Continued)

(56) References Cited

U.S. PATENT DOCUMENTS 5,974,549 A * 10/1999 Golan ..................... G06F 9/468
714/47.3
7,047,518 B2  5/2006 Little et al.
(Continued)

FOREIGN PATENT DOCUMENTS

CN          1959675 A      5/2007
CN        102819451 A     12/2012
(Continued)

OTHER PUBLICATIONS

PCT International Search Report and Written Opinion dated Jan. 23, 2014, issued in corresponding International Application No. PCT/CN2013/086450 (5 pages).
(Continued)

*Primary Examiner* — Oluseye Iwarere
*Assistant Examiner* — Reva R Moore
(74) *Attorney, Agent, or Firm* — Sheppard Mullin Richter & Hampton LLP

(57) ABSTRACT

A method and device for starting an external application program in a browser are provided. The method comprises: adding a standard HTML label representing a plugin into a webpage of a browser; adding an external application program plugin module corresponding to the label into the external application program; and after the browser receives an event of clicking the label, transmitting the click event to the external application program plugin module added into the external application program by invoking an interface of the external application program, the external application program plugin module of the external application program invoking an application programming interface which is
(Continued)

provided by an operating system for starting an application program to start the external application program.

16 Claims, 3 Drawing Sheets

(51) Int. Cl.
*G06Q 20/20* (2012.01)
*G06F 9/48* (2006.01)

(58) Field of Classification Search
USPC .................. 717/174; 718/102; 719/328
See application file for complete search history.

(56) References Cited

U.S. PATENT DOCUMENTS

| | | | |
|---|---|---|---|
| 7,246,351 | B2 | 7/2007 | Bloch et al. |
| 7,890,572 | B2 | 2/2011 | Goodman et al. |
| 8,707,451 | B2 | 4/2014 | Ture et al. |
| 8,887,152 | B1 * | 11/2014 | Chen ............... G06F 9/44568 717/174 |
| 9,052,925 | B2 | 6/2015 | Chaudri |
| 9,176,754 | B2 | 11/2015 | Kokkevis et al. |
| 9,542,368 | B1 | 1/2017 | Dorwin |
| 9,710,634 | B2 | 7/2017 | Fort et al. |
| 10,013,291 | B1 | 7/2018 | Nielsen |
| 10,241,980 | B2 | 3/2019 | Cahill |
| 2003/0149801 | A1 * | 8/2003 | Kushnirskiy ............. G06F 9/44 719/328 |
| 2007/0180380 | A1 | 8/2007 | Khavari et al. |
| 2009/0254912 | A1 * | 10/2009 | Roundtree ............... G06F 8/61 718/102 |
| 2013/0111328 | A1 * | 5/2013 | Khanna ................ G06F 16/958 715/234 |
| 2013/0198606 | A1 | 8/2013 | Farrell et al. |
| 2013/0198733 | A1 | 8/2013 | Farrell et al. |

FOREIGN PATENT DOCUMENTS

| | | |
|---|---|---|
| CN | 103049320 A | 4/2013 |
| EP | 1490775 B1 | 6/2014 |
| EP | 1531373 B1 | 7/2017 |

OTHER PUBLICATIONS

International Preliminary Report on Patentability for PCT/CN2013/086450, dated Jun. 23, 2015, 6 pages.
First Notice issued by China State Intellectual Property Office, dated Jan. 22, 2015 for Chinese Patent Application No. 201210553047.1 with search report.
Second Notice issued by China State Intellectual Property Office, dated Aug. 26, 2015 for Chinese Patent Application No. 201210553047.1.
Notification to Grant Patent Right for Invention issued by China State Intellectual Property Office, dated Mar. 1, 2016 or Chinese Patent Application No. 201210553047.1.

* cited by examiner

METHOD AND DEVICE FOR STARTING EXTERNAL APPLICATION PROGRAM IN BROWSER

CROSS-REFERENCE TO RELATED APPLICATION

The present application is a national stage application of International Application No. PCT/CN2013/086450, filed on Nov. 1, 2013, which claims the benefit of Chinese Patent Application No. 201210553047.1, filed on Dec. 17, 2012. The content of both of the above-referenced applications is herein incorporated by reference in their entirety.

TECHNICAL FIELD

The present invention relates to a technical field of mobile communication, and in particular, to a method and device for starting an external application program in a browser.

BACKGROUND

A browser based on an Android platform, at the time of an interaction between a user and an HTML (HyperText Markup Language) webpage opened in the browser, often needs to start an external application program in some interactive scenes (e.g. clicking a certain HTML label of the HTML page) to conduct a further interaction between the external application program and the user (e.g., the user inputs a bank account and password to make a payment). The external application program is referred to with respect to the browser program, and the external application program of the browser includes any application programs, excluding the browser program, which could interact with the browser, e.g., an online payment program of a bank.

With reference to FIG. 1, the method for starting an external application program in a browser based on the Android platform according to the prior art mainly includes: modifying the implementation of HTML in the browser; adding some implementations incompatible with the HTML into the code implementation of the browser (e.g., modifying or adding a definition and implementation of an HTML label to start an external application program after clicking the HTML label); the browser, in the implementations incompatible with HTML, invoking an API (application programming interface) which is provided by the Android system and used for starting an application program to start the external application program.

This method has defects such as: the implementation of the HTML standard in the browser is damaged, and the implementations which are incompatible with HTML are added, which are disadvantageous for extension. The browser needs to be modified every time it supports one more external application program, because when the browser invokes the API of Android system to start the external application program, information of the external application program (such as a package name of the external application program) is required for the implementation in the browser.

SUMMARY

The characteristics and advantages of the present invention will be exemplified in the descriptions of the following context, or will become more apparent from the following detailed description, or will be apprehended from practicing of the present invention.

In order to overcome the defects existing in the prior art, the present invention provides a method and device for starting an external application program in a browser, which support the starting of the external application program in the case that the HTML standard of the browser is not damaged and the browser needs not to be modified.

In order to solve the abovementioned technical problems, a technical scheme of the present invention is disclosed as follows.

According to an aspect of the present invention, a method for starting an external application program in a browser is provided, which includes:
adding a standard HTML label of representing a plugin into a webpage of a browser;
adding an external application program plugin module corresponding to the label into the external application program; and
after the browser receives an event of clicking the label, transmitting the click event to the external application program plugin module added into the external application program by invoking an interface of the external application program, the external application program plugin module of the external application program invoking an application programming interface which is provided by an operating system and used for starting an application program to start the external application program.

According to an embodiment of the present invention, the label is an embed label or an object label, and is associated with the external application program by setting a type attribute value of the embed label or the object label.

According to an embodiment of the present invention, an external application program plugin module, for example, conforming to a Netscape Plugin Application Programming Interface is added into an external application program; while transmitting the click event to the external application program plugin module of the external application program, the browser transmits the click event to the external application program plugin module of the external application program by invoking the Netscape Plugin Application Programming Interface at the external application program side.

According to an embodiment of the present invention, an operating system is an Android operating system.

According to an embodiment of the present invention, the external application program is a mobile payment program, and after receiving the click event transmitted by the browser, the external application program plugin module of the mobile payment program invokes an Android operating system interface Context.startActivity( ) to start Activity of the mobile payment program.

According to another aspect of the present invention, a device for starting an external application program in a browser is provided, which includes:
a browser module configured to add a standard HTML label representing a plugin into a webpage of a browser;
an external application program module configured to add an external application program plugin module corresponding to the label into the external application program;
an operating system module configured to provide an application programming interface used for starting an application program;
wherein after receiving an event of clicking the label, the browser module transmits the click event to the external application program plugin module added into the external application program module by invoking an interface of the external application program, and the external application program plugin module of the external application program module invokes an application programming interface which is provided by an operating system module and used for starting an application program to start the external application program.

According to an embodiment of the present invention, the label added by the browser module is an embed label or an object label, and is associated with the external application program by setting a type attribute value of the embed label or the object label.

According to an embodiment of the present invention, the external application program module adds an external application program plugin module conforming to a Netscape Plugin Application Programming Interface into an external application program, and the external application program module includes an external application program plugin module with the Netscape Plugin Application Programming Interface and a functional module that provides interface and functionality for the external application program; the browser module includes a plugin interface implementation module with the Netscape Plugin Application Programming Interface; the browser module transmits the click event to the external application program plugin module of the external application program module by invoking the Netscape Plugin Application Programming Interface at the external application program module side, and the external application program plugin module of the external application program module invokes an application programming interface which is provided by an operating system module and used for starting an application program to start an functional module of the external application program module.

According to an embodiment of the present invention, the operating system module employs an Android operating system.

According to an embodiment of the present invention, the external application program module is a mobile payment program module, and after receiving the click event transmitted by the browser module, the external application program plugin module of the mobile payment program module invokes an Android operating system interface Context.startActivity( ) to start Activity of the mobile payment program module.

As an improvement to the prior art, the present invention discloses a universal method for starting an external application program in a browser, providing the convenience for extension in the case that the HTML standard of the browser is not damaged, and the implementation method of the present invention is compatible with the HTML standard and supports the starting of the external application program in the case that the browser needs not to be modified.

By adopting the exemplary embodiments, the external application program developers need not make any modifications to the browser to realize starting the external application program in the browser, and the external application program developers are merely required to: 1. add a standard HTML label (such as an embed label or an object label and its type attribute value) when compiling the HTML webpage; 2. add a browser plugin into the external application program, for instance, the browser plugin conforming to the NPAPI (NPAPI is an abbreviation of the Netscape Plugin Application Programming Interface, which is a browser plugin standard, providing a series of universal interfaces used for plugin implementation), i.e., add the NPAPI interface into Dynamic Link Library (DLL) files of the external application program.

In respect to the external application program, by adding one browser plugin (e.g. the browser plugin that implements the NPAPI) and invoking the API which is provided by the operating system and used for starting the application program during the event processing of the browser plugin, the user can be allowed to start the external application program by clicking the label or plugin in the webpage of the browser in the case that the HTML standard of the browser is not damaged and the browser needs not to be modified.

The features and contents of the technical schemes will be more apparent and comprehensive to persons of ordinary skill in the art from reading through the specification of the present invention.

BRIEF DESCRIPTION OF THE DRAWINGS

The advantages and implementations of the present invention will be more apparent in the following detailed description with reference to the drawings together with the examples, and what illustrated in the drawings are for illustration purposes only, not in any terms limiting the present invention, in which.

DESCRIPTION OF THE EMBODIMENTS

Figure 1:
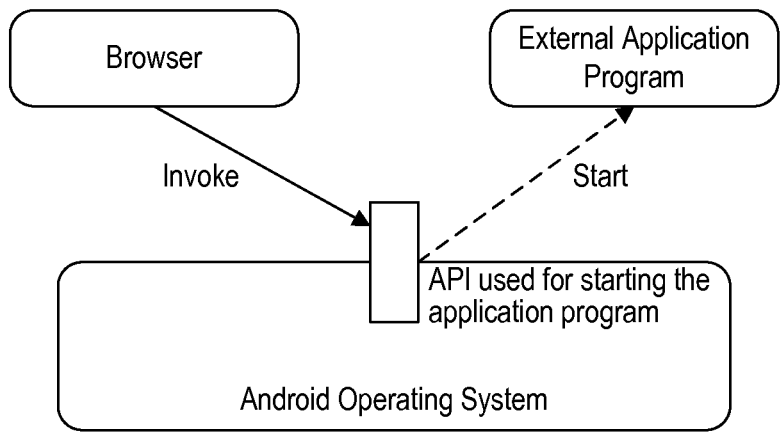
FIG. 1 is a schematic view illustrating a method for starting an external application program in a browser based on an Android platform according to the prior art.
Figure 2:
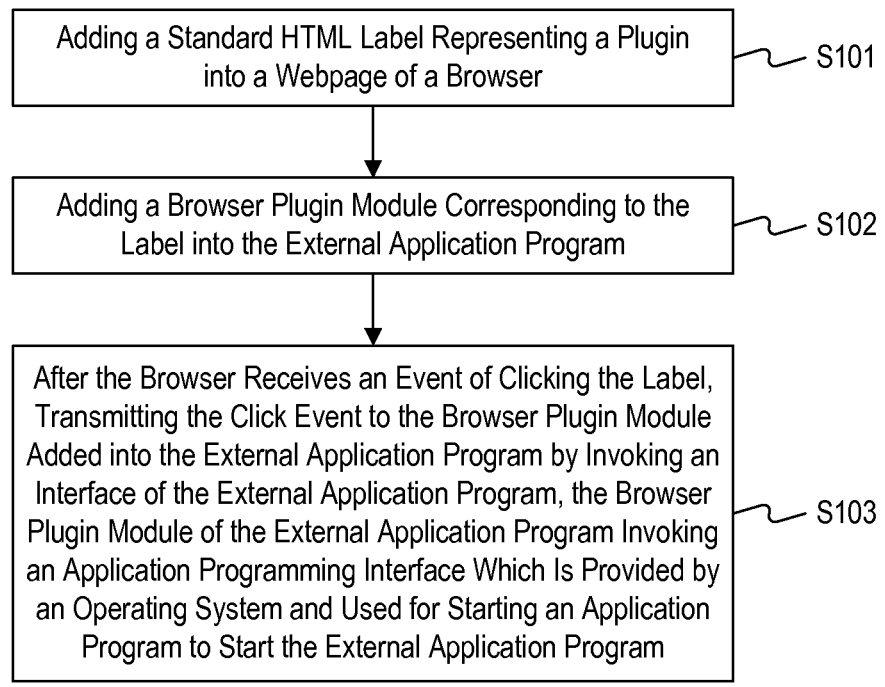
FIG. 2 is a flow chart illustrating a method for starting an external application program in a browser according to an embodiment of the present invention.

To overcome the defects in the prior art that the HTML standard of the browser is damaged and the browser needs to be modified every time it supports one more external application program, a method for starting an external application program in a browser is provided in this embodiment, as shown in FIG. 2, which includes:

S101, adding a standard HTML label representing a plugin into a webpage of a browser;

S102, adding an external application program plugin module corresponding to the label into the external application program; and S103, after the browser receives an event of clicking the label, transmitting the click event to the external application program plugin module added into the external application program by invoking an interface of the external application program (e.g., the NPAPI), the external application program plugin module of the external application program invoking an application programming interface which is provided by an operating system and used for starting an application program to start the external application program.

As a preferred embodiment, the label is an embed label, and is associated with the external application program by setting a type attribute value of the embed label. In addition, the label may also be an object label, and is associated with the external application program by setting a type attribute value of the object label. Preferably, one external application program plugin module, for example, conforming to a Netscape Plugin Application Programming Interface (NPAPI) is added into an external application program; while transmitting the click event to the external application program plugin module of the external application program, the browser transmits the click event to the external application program plugin module of the external application program by invoking the Netscape Plugin Application Programming Interface (NPAPI) at the external application program side.

In this embodiment, the operating system is an Android operating system. The present invention is not limited to the Android operating system, and may employ any other operating systems.

In a specific example, the external application program may be a mobile payment program, and after receiving the click event transmitted by the browser, the mobile payment program invokes an Android operating system interface Context.startActivity( ) to start Activity of the mobile payment program.

Figure 3:
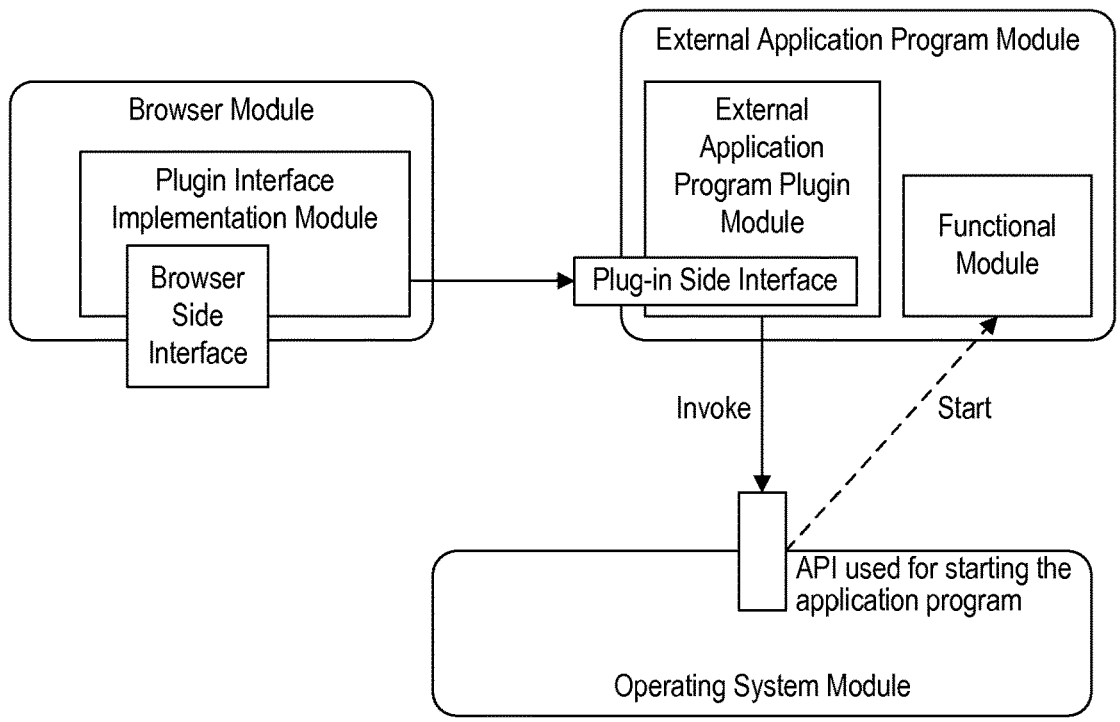
FIG. 3 is a schematic structural view illustrating a device for starting an external application program in a browser according to an embodiment of the present invention.

With reference to FIG. 3, a device for starting an external application program in a browser is also provided in this embodiment, which includes:

- a browser module, used for adding a standard HTML label representing a plugin into a webpage of a browser;
- an external application program module, for adding an external application program plugin module corresponding to the label into the external application program;
- an operating system module, for providing an application programming interface used for starting an application program;
- wherein after receiving an event of clicking the label, the browser module transmits the click event to the external application program plugin module added into the external application program by invoking an interface of the external application program, and the external application program plugin module of the external application program module invokes an application programming interface which is provided by an operating system module and used for starting an application program to start the external application program.

It should be noted that the API defined by the Netscape Plugin Application Programming Interface (NPAPI) is divided into two categories: Browser Side Plug-in API and Plug-in Side Plug-in API. The interface of the external application program described in the present invention may be a Plug-in Side Plug-in API.

As a preferred embodiment of the present invention, the label added by the browser module is an embed label, and is associated with the external application program by setting a type attribute value of the embed label. In addition, the label may also be an object label, and is associated with the external application program by setting a type attribute value of the object label. Preferably, the external application program module adds one external application program plugin module conforming to a Netscape Plugin Application Programming Interface into the external application program, and the external application program module includes an external application program plugin module with the Netscape Plugin Application Programming Interface and a functional module that provides interface and functionality for the external application program; the browser module includes a plugin interface implementation module with the Netscape Plugin Application Programming Interface; the browser module transmits the click event to the external application program plugin module of the external application program module by invoking the Netscape Plugin Application Programming Interface at the external application program module side, and the external application program plugin module of the external application program module invokes an application programming interface which is provided by an operating system module and used for starting an application program to start an functional module of the external application program module.

In this embodiment, the operating system module employs an Android operating system. The present invention is not limited to the Android operating system, and may employ any other operating systems.

In a specific example, the external application program module is a mobile payment program module, and after receiving the click event transmitted by the browser module, the external application program plugin module of the mobile payment program module invokes an Android operating system interface Context.startActivity( ) to start Activity of the mobile payment program module.

Figure 4:
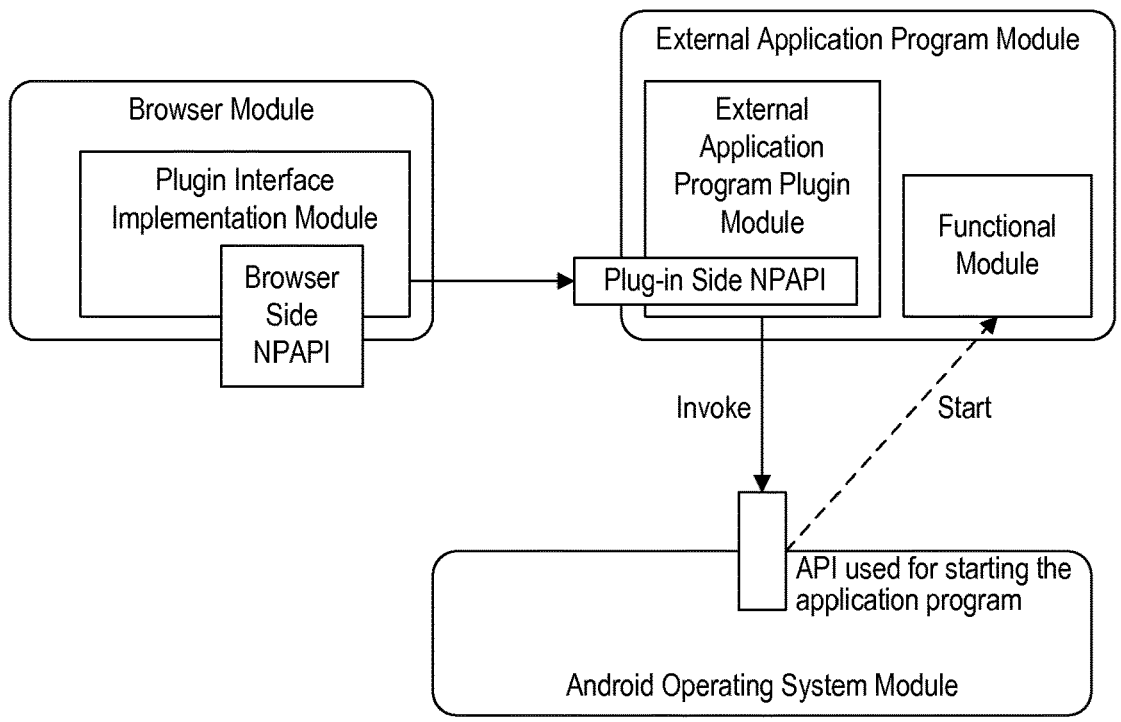
FIG. 4 is a schematic structural view illustrating a device for starting an external application program in a browser based on an Android platform according to an embodiment of the present invention.

With reference to FIG. 4, the implementation method of this embodiment is illustrated in an example of starting an external application program in the browser based on the Android platform:

Firstly, the embed label in the HTML webpage code is added as follows:

<embed type="application/x-extenalapp"/>
where the embed label is a standard HTML label, and each browser has the implementation of the embed label. The implementation of the embed label is not deliberately added or modified for the browser in the present invention, and the embed label is normally inherent in the browser, which is specified in the HTML standard.

Thereafter, the implementation of the external application program includes two parts (two modules): the external application program plugin module that implements the NPAPI and a functional module based on the implementation of the Android platform (in the present invention, any component modules, excluding the external application program plugin module, of the application program are collectively referred to as the functional module, and the functional module provides the user interface for the application program and the implementation of the functions related to the application program). In respect to the current Android application program, starting the Android application program in the webpage can be achieved just by adding the implementation of the external application program plugin module into the program.

Finally, the external application program plugin module of the external application program, when the implementation of the NPAPI interface process an event (e.g., an event that the user clicks the label or plugin), invokes the API (application programming interface) which is provided by the Android operating system and used for starting a certain application program.

The Android operating system provides the API used for starting an application program, and by designating the package name of the application program at the time of invoking the API, the Android system will find the application program corresponding to the package name, and then start this application program, thereby achieving the objective of "using the plugin to start the application program" of the present disclosure.

In this manner, when the user opens a webpage in the browser, the webpage contains one embed label representing the plugin, and the embed label is represented as a plugin in the webpage. The objective of the webpage is: when the user clicks the label or plugin in the webpage, the browser automatically starts one external application program. After receiving an event that the user clicks the label or plugin, the browser transmits the click event to the browser's plugin interface implementation module, and at last the click event is transmitted by the NPAPI to the external application program plugin module of the external application program. The external application program plugin module of the external application program, in the course of processing the click event, invokes the API which is provided by the Android operating system and used for starting an application program, and designates the external application program to be started in invoking parameters, then the Android system will start the designated external application program (thereafter the functional sub-module of the external application program provides the user interface), and finally the objective of using the plugin to start an external application program is achieved.

In the HTML, the embed label defines the embedded content, such as the plugin. The embed label is in the HTML page and is a part of the HTML page; the plugin interface implementation module of the browser is a part of the browser, and the plugin interface implementation module is an implementation module for embodying the embed label of the HTML in the browser. The type attribute of the embed label specifies a media type of the embedded content.

By applying the present invention, the webpage developers can compile different webpages according to different practical requirements, and start a certain external application program through the webpage, so that the external application program provides the functions that cannot be provided by the webpage. The present invention provides the browser developers with a scheme and framework convenient for extension, and there is no need to modify the browser to start the external application program associated with the webpage according to the type attribute value of the embed label or the object label by the webpage. The present invention provides the external application program developers with a scheme and framework convenient to transfer, and can easily reform the current application program into the external application program started by the browser through the webpage, and the external application program developers only needs to add one plugin sub-module that implements the Plug-in Side NPAPI into the current application program.

Figure 5:
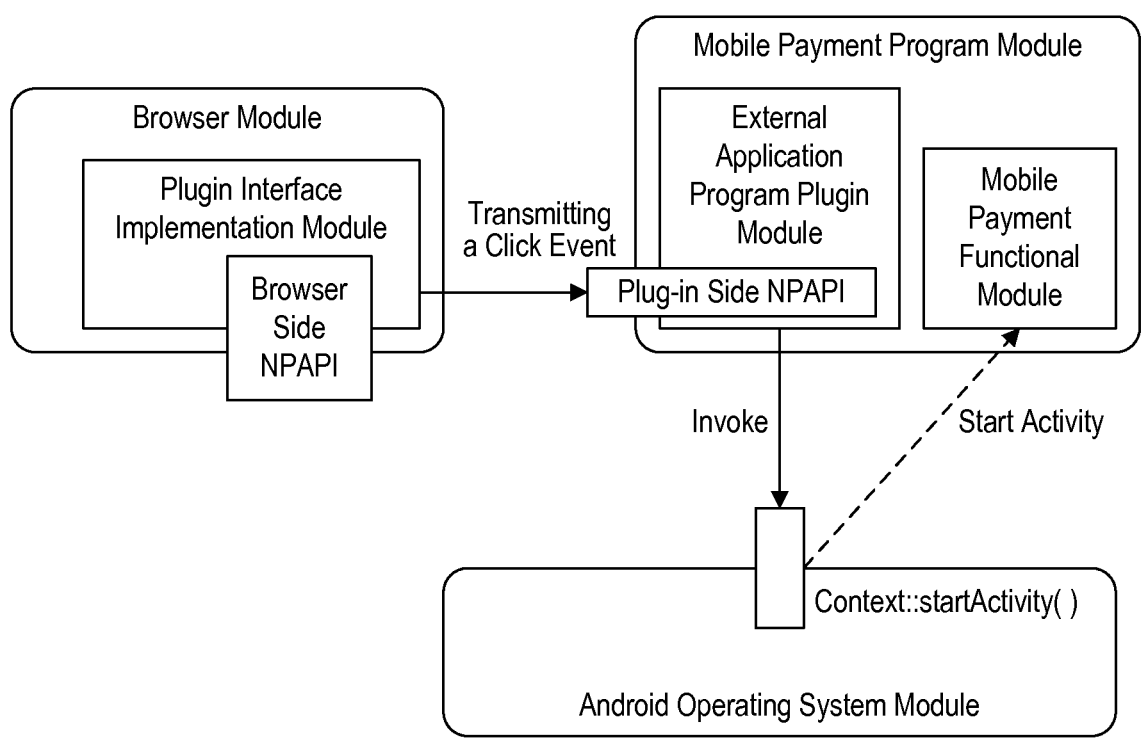
FIG. 5 is a schematic structural view illustrating a device for starting a mobile payment program in a browser based on an Android platform according to an embodiment of the present invention.

With reference to FIG. 5, the example of starting the mobile payment program in the browser based on the Android platform is illustrated.

In respect to the mobile payment program, the browser of the Android platform does not need any modifications, and only one external application program plugin module is added into the original mobile payment program module to constitute the mobile payment plugin, which realizes starting the mobile payment program in the webpage of the mobile browser. This technical scheme realizes a loose coupling of the browser and the external application program and flexible extensions. The details of the implementation of the technical scheme are described as follows:

1. The embed label in the HTML webpage code is added as follows:
   <embed type="application/x-unionpayplugin"/>

2. The mobile payment program module includes two parts: an external application program plugin module that implements the NPAPI and a mobile payment functional module based on the implementation of the Android platform.

3. After receiving the event of clicking the label or plugin, the external application program plugin module of the mobile payment program module invokes an Android operating system interface Context.startActivity( ) to start Activity of the functional module of the mobile payment program module.

Context.startActivity( ) actually is the API which is provided by the Android system and used for starting an application program, and Activity is a part of the mobile payment functional module and is also one of the essential parts that constitute the Android application program having the user interface, which belongs to the concept of the Android platform. Activity is a component of the Android application program, providing a screen, so that the user can interact to accomplish a task, such as dialing, photographing, sending emails, and viewing maps.

Hence, in respect to the external application program, only by adding one browser plugin (e.g. the browser plugin that implements the NPAPI) and invoking the API which is provided by an operating system and used for starting the application program during the event processing of the browser plugin, the user can be allowed to start the external application program by clicking the label or plugin in the webpage of the browser in the case that the HTML standard of the browser is not damaged and the browser needs not to be modified.

Preferred embodiments of the present invention are described with reference to the accompanying drawings in the foregoing, and a person skilled in the art can derive various variation solutions to implement the present invention without departing from the scope and essence of the present invention. For example, features shown or described as a part of one embodiment may be used in another embodiment to obtain still another embodiment. The above descriptions are merely preferred feasible embodiments of the present invention and are not intended to limit the scope of the present invention, and equivalent variations made according to the specification and content of the accompanying drawings of the present invention shall all fall within the scope of the present invention.

The invention claimed is:

1. A method for starting an external application program in a browser, comprising:
   adding a standard HTML label representing a plugin into a webpage of a browser,
   wherein the browser comprises a plugin interface implementation module for embodying the standard HTML label in the browser,
   wherein a type attribute value of the standard HTML label identifies an external application program that is external to the browser;
   adding an external application program plugin module corresponding to the standard HTML label into the external application program that is external to the browser;
   displaying a plugin label in the webpage, wherein the plugin label corresponds to a type attribute value of the standard HTML label;
   after the browser receives an event of clicking the plugin label in the webpage, transmitting the click event to the plugin interface implementation module;
   transmitting the click event to the external application program plugin module by invoking an interface of the external application program, the external application program plugin module invoking an application programming interface provided by an operating system for starting an application program; and starting the external application program installed on the device without modifying the browser.

2. The method according to claim 1, wherein the standard HTML label includes an embed label or an object label.

3. The method according to claim 1, wherein the external application program plugin module conforms with a browser Plugin Application Programming Interface.

4. The method according to claim 3, wherein transmitting the click event to the external application program plugin module by invoking an interface of the external application program comprises:

transmitting the click event to the external application program plugin module of the external application program by invoking the browser Plugin Application Programming Interface at the external application program.

5. The method according to claim 1, wherein the operating system is a mobile operating system.

6. The method according to claim 1, wherein the external application program includes a mobile payment program.

7. The method according to claim 6, wherein, the operating system is a mobile operating system, and the step of the external application program plugin module invoking an application programming interface provided by an operating system for starting an application program to start the external application program comprises:

the external application program plugin module of the mobile payment program invoking a mobile operating system interface Context.startActivity( ) to start Activity of the mobile payment program.

8. A system for starting an external application program in a browser, comprising one or more processors and one or more non-transitory computer-readable memories coupled to the one or more processors and configured with instructions executable by the one or more processors to cause the system to perform operations comprising:

adding a standard HTML label representing a plugin into a webpage of a browser, wherein the browser comprises a plugin interface implementation module for embodying the standard HTML label in the browser, wherein a type attribute value of the standard HTML label identifies an external application program that is external to the browser;

adding an external application program plugin module corresponding to the standard HTML label into the external application program that is external to the browser;

displaying a plugin label in the webpage, wherein the plugin label corresponds to a type attribute value of the standard HTML label;

after the browser receives an event of clicking the plugin label in the webpage, transmitting the click event to the plugin interface implementation module;

transmitting the click event to the external application program plugin module by invoking an interface of the external application program, the external application program plugin module invoking an application programming interface provided by an operating system for starting an application program; and starting the external application program without modifying the browser.

9. The system according to claim 8, wherein the standard HTML label includes an embed label or an object label.

10. The system according to claim 8, wherein the external application program plugin module conforms with a browser Plugin Application Programming Interface.

11. The system according to claim 10, wherein the external application program module further provides an interface and functionality for the external application program.

12. The system according to claim 11, wherein transmitting the click event to the external application program plugin module by invoking an interface of the external application program comprises:

transmitting the click event to the external application program plugin module of the external application program by invoking the browser Plugin Application Programming Interface at the external application program.

13. The system according to claim 8, wherein the operating system is a mobile operating system.

14. The system according to claim 13, wherein the operating system is a mobile operating system, and the step of the external application program plugin module invoking an application programming interface provided by an operating system for starting an application program to start the external application program comprises:

the external application program plugin module of the mobile payment program invoking a mobile operating system interface Context.startActivity( ) to start Activity of the mobile payment program.

15. The system according to claim 8, wherein the external application program includes a mobile payment program.

16. The system according to claim 8, wherein, in response to the standard HTML label including an embed label, the type attribute of the embed label indicates a media type of the plugin.

\* \* \* \* \*